(12) United States Patent
Gross et al.

(10) Patent No.: US 9,310,478 B2
(45) Date of Patent: Apr. 12, 2016

(54) RADAR SENSOR DEVICE HAVING AT LEAST ONE PLANAR ANTENNA DEVICE

(75) Inventors: Volker Gross, Ditzingen (DE); Goetz Kuehnle, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 672 days.

(21) Appl. No.: 13/496,397

(22) PCT Filed: Jul. 16, 2010

(86) PCT No.: PCT/EP2010/060316
§ 371 (c)(1),
(2), (4) Date: May 25, 2012

(87) PCT Pub. No.: WO2011/032745
PCT Pub. Date: Mar. 24, 2011

(65) Prior Publication Data
US 2012/0223852 A1    Sep. 6, 2012

(30) Foreign Application Priority Data
Sep. 16, 2009 (DE) .......................... 10 2009 029 503

(51) Int. Cl.
*G01S 13/93* (2006.01)
*H01Q 21/22* (2006.01)
(Continued)

(52) U.S. Cl.
CPC ............ *G01S 13/931* (2013.01); *H01Q 1/3233* (2013.01); *H01Q 21/065* (2013.01);
(Continued)

(58) Field of Classification Search
CPC ..... G01S 13/931; G01S 7/032; H01Q 21/061; H01Q 21/065

USPC ............................................. 342/70; 343/844
See application file for complete search history.

(56) References Cited

U.S. PATENT DOCUMENTS 5,774,690 A * 6/1998 O'Neill ................. G06N 3/126
                                                    367/13
6,351,243 B1 * 2/2002 Derneryd ............... H01Q 1/246
                                                    343/700 MS
(Continued)

FOREIGN PATENT DOCUMENTS

| DE | 10036131 | 2/2002 |
| EP | 1486796  | 12/2004 |
| EP | 2060929  | 5/2009 |

OTHER PUBLICATIONS

Feger, R.; Wagner, C.; Schuster, S.; Scheiblhofer, S.; Jager, H.; Stelzer, A, "A 77-GHz FMCW MIMO Radar Based on an SiGe Single-Chip Transceiver," Microwave Theory and Techniques, IEEE Transactions on , vol. 57, No. 5, pp. 1020,1035, May 2009.*

(Continued)

*Primary Examiner* — John B. Sotomayor
*Assistant Examiner* — Marcus Windrich
(74) *Attorney, Agent, or Firm* — Kenyon & Kenyon LLP

(57) ABSTRACT

A radar sensor device having at least one planar antenna device that includes a plurality of vertically oriented antenna columns which are configured as a sparse array in one plane in parallel at defined mutual distances and which each have at least two line-fed patch elements, the sparse array of antenna columns is designed to have such a minimal redundancy that the amount of defined distances among the antenna columns in the sparse array is at least equal to all of the different distances between any two antenna columns of a corresponding non-sparse array of a planar antenna device having the same antenna aperture and the same characteristics of the antenna columns, but is the most minimum possible number.

6 Claims, 2 Drawing Sheets

(51) Int. Cl.
*H01Q 1/32* (2006.01)
*H01Q 21/06* (2006.01)

(52) U.S. Cl.
CPC ....... *H01Q 21/22* (2013.01); *G01S 2013/9321* (2013.01); *G01S 2013/9346* (2013.01); *G01S 2013/9375* (2013.01)

(56) References Cited

U.S. PATENT DOCUMENTS

| | | | | |
|---|---|---|---|---|
| 7,609,198 B2* | 10/2009 | Chang | ..................... | G01S 13/89 342/179 |
| 2005/0225481 A1* | 10/2005 | Bonthron | ................. | G01S 7/032 342/175 |
| 2007/0285315 A1* | 12/2007 | Davis | ........................ | G01S 3/74 342/377 |
| 2008/0258964 A1* | 10/2008 | Schoeberl | ............... | G01S 7/032 342/189 |

OTHER PUBLICATIONS

International Search Report, PCT International Application No. PCT/EP2010/060316, dated Oct. 14, 2010.

\* cited by examiner

RADAR SENSOR DEVICE HAVING AT LEAST ONE PLANAR ANTENNA DEVICE

FIELD OF THE INVENTION

The present invention relates to a radar sensor device having at least one planar antenna device that includes a plurality of vertically oriented antenna columns which are configured as a sparse array in one plane in parallel at defined mutual distances and which each have at least two line-fed patch elements. The present invention also relates to a device, in particular a driver assistance system of a motor vehicle.

BACKGROUND INFORMATION

Within the framework of driver assistance systems, radar sensors are increasingly being used in motor vehicles for sensing the traffic environment, for example, for radar-based distance control (adaptive cruise control systems/ACC). Such a cruise control system is described, for example, in "Adaptive Fahrgeschwindigkeitsregelung ACC," (Adaptive Cruise Control ACC) yellow technical instruction series, 2002 edition by Robert Bosch GmbH.

Due to the flat design and ease of manufacture thereof, for example in etching processes, what are generally referred to as planar antenna devices or patch antennas are particularly suited for use in the above described radar sensors. In the case of such antennas, it is a question of a two-dimensional array of radiating resonators (antenna elements, respectively patch elements/patches), each having a defined amplitude and phase. By superimposing the radiation diagrams of the individual patch elements, one obtains the resulting radiation diagram of the antenna, the rows being responsible for the azimuthal characteristic and the columns for the elevation characteristic. The antenna elements are usually configured in vertically oriented antenna columns.

Many radar sensors used for driving-environment sensing in automotive applications make use of such planar antenna designs. One advantage of the planar antenna designs is the low overall depth of the radar sensors resulting therefrom. Greater flexibility is thereby attained for the installation location of the radar sensors, and new fields of application emerge, such as installation in the side region of the vehicle. Besides the size of the radar sensors, the costs of manufacturing the same are naturally also a determining factor. Especially in planar antenna designs, where a signal evaluation is performed on the individual channels (no HF beam-forming), the number of mixers used constitutes a considerable cost factor. In this context, the configuration, respectively the number of antenna patches plays an important role. Conventional radar sensors having planar antenna devices generally have a uniform linear array (ULA) structure. The antenna columns having the patch elements are spaced at equidistant intervals which generally reside within the range of half of the wavelength in air ($\lambda/2$).

The antenna aperture is the decisive factor in achieving a best possible angular precision using the radar sensor system. The larger the antenna aperture is, the better is the angular precision. If the antenna aperture is provided with a uniform linear array structure, as in previously known radar sensors, a large number of mixers is then required, thereby increasing the total costs for the sensors.

German Patent Application No. DE 100 36 131 A1 describes a radar sensor used for sensing the traffic situation in the driving environment of a motor vehicle. It includes a carrier element having an array of patch antennas in the form of a combination of a filled subarray of patch antennas and a sparse subarray of patch antennas. However, the patch antennas are provided redundantly, i.e., the signal relations are measured multiple times.

SUMMARY

In accordance with the present invention, an example radar sensor device having at least one planar antenna device is provided that includes a plurality of vertically oriented antenna columns which are configured as a sparse array in one plane in parallel at defined mutual distances and which each feature at least two line-fed patch elements, the sparse array of antenna columns being configured with such a minimal redundancy that the total amount of defined distances among the antenna columns in the sparse array is at least equal to all of the different distances between any two antenna columns of a corresponding non-sparse array of a planar antenna device having the same antenna aperture and the same antenna column characteristics, but is the most minimum possible number.

By implementing these measures, a very good compromise is obtained between the requirement for single-valuedness and precision of the angles through the use of what are generally referred to as minimum redundancy arrays (MRA) of antenna columns. The antenna columns having patch elements are not configured equidistantly, but using sparse arrays in consideration of the minimal redundancy principle. This advantageously leads to a substantial further reduction in the number of antenna columns, respectively patch elements and, thus, also in the number of required mixers, thereby achieving a cost reduction in the manufacturing of the radar sensor. Due to the fact that each distance between the antenna columns, thus each phase relationship is present at least once, but as infrequently as possible, a minimal redundancy is achieved. In a conventional, respectively non-sparse array of a planar antenna device having the same aperture, all of the different distances among any given combinations of antenna columns must be present in order to ensure single-valuedness (uniqueness).

The defined mutual distances of the antenna columns may each be an integral multiple of a constant basic distance. It is advantageous that the constant basic distance be smaller than or equal to one half of the wavelength in air. A single-valuedness is then obtained for the +/−90 degree range.

BRIEF DESCRIPTION OF THE DRAWINGS

An exemplary embodiment of the present invention is described below with reference to the figures.

Detailed Description of Example Embodiments

Figure 1:
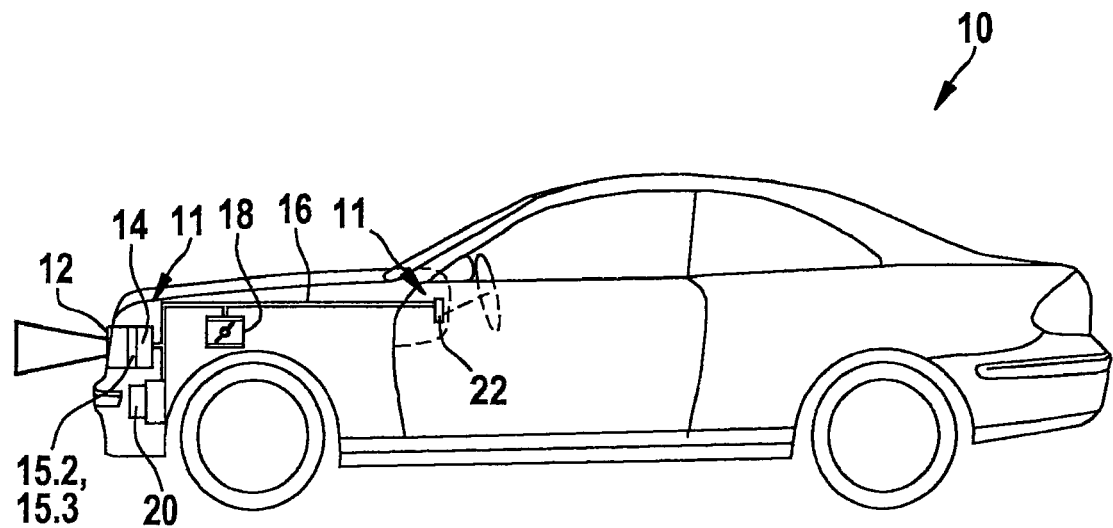
FIG. 1 shows a schematic representation of the main components of a driver assistance system, respectively of an adaptive cruise control device in a motor vehicle.

A motor vehicle 10 illustrated in FIG. 1 having an adaptive cruise control device 11 as a driver assistance system features a radar sensor device 12 as an object detection sensor which is mounted on the front end of motor vehicle 10 and in whose housing a control device 14 of adaptive cruise control device 11 is also accommodated. Radar sensor device 12 is used for detecting objects in the surrounding field of motor vehicle 10. Radar sensor device 12 is connected to control device 14. Control device 14 is connected via a data bus 16 (CAN, MOST or the like) to an electronic drive control unit 18, a brake system control unit 20, as well as to an HMI control unit 22 of a human-machine interface. In further exemplary embodiments (not shown), control unit 14 and HMI control unit 22 may also be integrated in a control device of adaptive cruise control device 12, in particular in a shared housing.

With the aid of a multi-beam radar, radar sensor device 12 measures the distances, relative velocities and azimuthal angles of objects located ahead of vehicle 10 that reflect radar waves. The raw data received at regular intervals, for example every 10 ms, are evaluated in control device 14 in order to identify and track individual objects and, in particular, to recognize a vehicle that is immediately ahead on the same lane, and to select it as a target object.

Figure 3:
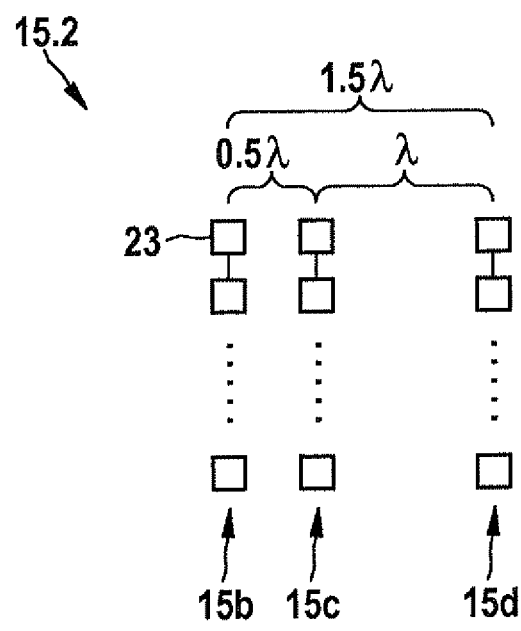
FIG. 3 shows a schematic representation of an array of a planar antenna device having three antenna columns for a first specific embodiment of the radar sensor device according to the present invention.
Figure 4:
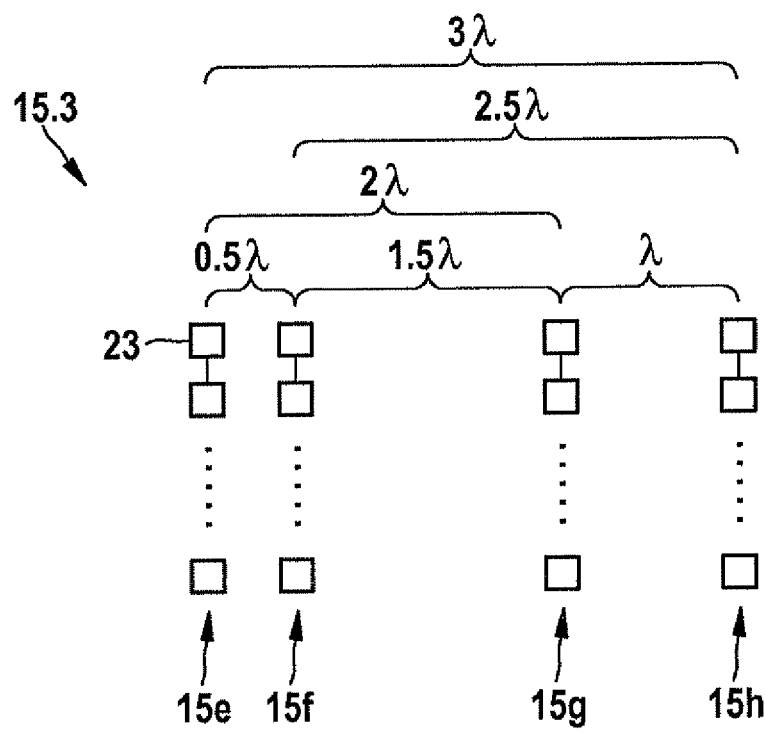
FIG. 4 shows a schematic representation of an array of a planar antenna device having four antenna columns for a second specific embodiment of the radar sensor device according to the present invention.

As is also readily apparent from FIG. 1, radar sensor device 12 according to the present invention features a planar antenna device having arrays 15.2 or 15.3 of antenna columns 15b through 15h (see FIGS. 3 and 4).

Figure 2:
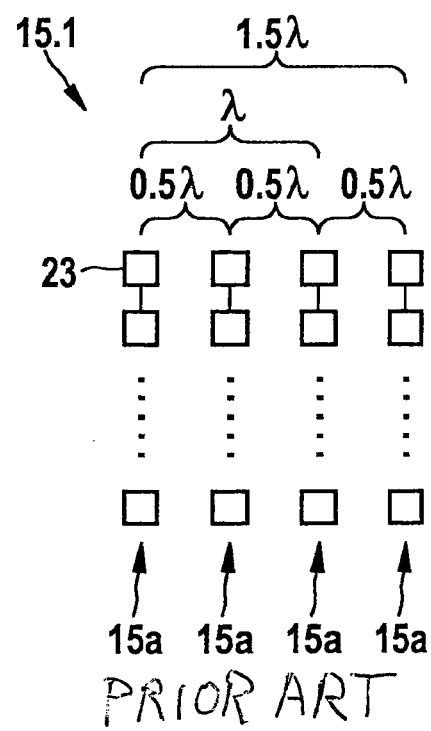
FIG. 2 shows a schematic representation of an array of a conventional planar antenna device having four antenna columns.

FIG. 2 illustrates a planar antenna device, respectively a conventional non-sparse array 15.1 having four vertically oriented antenna columns 15a which are configured in one plane in parallel at mutual distances. Antenna columns 15a are configured at equidistant, i.e., constant mutual basic distances which correspond to half wavelength λ in air. As is apparent in FIG. 2, 0.5·wavelength λ in air, 1.0·wavelength λ in air and 1.5·wavelength λ in air are manifested as different distances.

FIG. 3 shows a planar antenna device for a first specific embodiment of radar sensor device 12 according to the present invention having three vertically oriented antenna columns 15b, 15c and 15d which are configured as a sparse array 15.2 in one plane in parallel at defined mutual distances and which each feature a plurality of line-fed patch elements 23. Sparse array 15.2 of antenna columns 15b, 15c and 15d is designed to have such a minimal redundancy that the total amount of defined distances among antenna columns 15b, 15c and 15d in sparse array 15.2 is at least equal to all different distances between any two antenna columns 15a of a corresponding non-sparse array 15.1 from FIG. 1 of a planar antenna device having the same antenna aperture and the same characteristics of antenna columns 15a, but is the lowest, most minimum possible number. As is also apparent from FIG. 3, a distance of 0.5·wavelength λ in air is provided between antenna columns 15b and 15c, and a distance amounting to 1.0·wavelength λ in air is provided between antenna columns 15c and 15d. Moreover, a distance of 1.5·wavelength λ in air remains between antenna columns 15b and 15d.

FIG. 4 shows a planar antenna device for a second specific embodiment of radar sensor device 12 according to the present invention having four vertically oriented antenna columns 15e, 15f, 15g and 15h which are configured as a sparse array 15.3 in one plane in parallel at defined mutual distances. As is apparent from FIG. 4, a distance of 0.5·wavelength λ in air is provided between antenna columns 15e and 15f; a distance of 1.5·wavelength λ in air is provided between antenna columns 15f and 15g; and a distance amounting to 1.0·wavelength λ in air is provided between antenna columns 15g and 15h. In addition, a distance of 2.0·wavelength λ in air remains between antenna columns 15e and 15g; a distance of 2.5·wavelength λ in air remains between antenna columns 15f and 15h; and a distance of 3.0·wavelength λ in air remains between antenna columns 15e and 15h.

The defined mutual distances of antenna columns 15a through 15g are each an integral multiple of a constant basic distance, namely half of wavelength λ in air.

What is claimed is:

1. A radar sensor device, comprising:
   at least one planar antenna device that includes a plurality of vertically oriented antenna columns which are configured as a sparse array in one plane in parallel at defined mutual distances and which each have at least three line-fed patch elements;
   wherein the sparse array of antenna columns has a minimal redundancy so that a total amount of defined distances among the antenna columns in the sparse array is at least equal to all of the distances between any two of the antenna columns of a corresponding non-sparse array of a planar antenna device having a same antenna aperture and same characteristics of the antenna columns,
   wherein the defined mutual distances of the antenna columns are each an integral multiple of a constant basic distance,
   wherein the total distance is the minimum distance for which the total amount of defined distances among the antenna columns in the sparse array is at least equal to all of the distances between any two of the antenna columns,
   wherein the antenna columns are not all uniformly spaced with respect to other adjacent antenna columns,
   wherein the sparse array of antenna columns is configured to have a minimal redundancy such that a total amount of defined distances among the antenna columns in the sparse array is at least equal to all different distances between any two of the antenna columns of a corresponding non-sparse array of a planar antenna device having the same antenna aperture and the same characteristics of antenna columns, but is the minimum possible number, and
   wherein there are three of the vertically oriented antenna columns which are configured as the sparse array in one plane in parallel at defined mutual distances and which each include the line-fed patch elements, wherein a distance of 0.5·wavelength λ in air is provided between a first one and a second one of the antenna columns, and a distance amounting to 1.0·wavelength λ in air is provided between the second one and a third one of the antenna columns, and wherein a distance of 1.5·wavelength λ in air remains between the first one and the third one of the antenna columns.

2. The radar sensor device as recited in claim 1, wherein the constant basic distance is smaller than or equal to one half of a wavelength in air.

3. A driver assistance system of a motor vehicle, comprising:
   a control device; and
   at least one radar sensor device, connected to the control device, for detecting objects in a surrounding field of the motor vehicle, the radar sensor device including at least one planar antenna device that includes a plurality of vertically oriented antenna columns which are configured as a sparse array in one plane in parallel at defined mutual distances and which each have at least three line-fed patch elements;
   wherein the sparse array of antenna columns has a minimal redundancy so that a total amount of defined distances among the antenna columns in the sparse array is at least equal to all of the distances between any two of the antenna columns of a corresponding non-sparse array of a planar antenna device having a same antenna aperture and same characteristics of the antenna columns, wherein the defined mutual distances of the antenna columns are each an integral multiple of a constant basic distance, wherein the total distance is the minimum distance for which the total amount of defined distances among the antenna columns in the sparse array is at least equal to all of the distances between any two of the antenna columns, wherein the antenna columns are not all uniformly spaced with respect to other adjacent antenna columns, wherein the sparse array of antenna columns is configured to have a minimal redundancy such that a total amount of defined distances among the antenna columns in the sparse array is at least equal to all different distances between any two of the antenna columns of a corresponding non-sparse array of a planar antenna device having the same antenna aperture and the same characteristics of antenna columns, but is the minimum possible number, and wherein there are three of the vertically oriented antenna columns which are configured as the sparse array in one plane in parallel at defined mutual distances and which each include the line-fed patch elements, wherein a distance of 0.5·wavelength $\lambda$ in air is provided between a first one and a second one of the antenna columns, and a distance amounting to 1.0·wavelength $\lambda$ in air is provided between the second one and a third one of the antenna columns, and wherein a distance of 1.5·wavelength $\lambda$ in air remains between the first one and the third one of the antenna columns.

4. The driver assistance system as recited in claim 3, wherein the constant basic distance is smaller than or equal to one half of a wavelength in air.

5. A driver assistance system of a motor vehicle, comprising:
    a control device; and
    at least one radar sensor device, connected to the control device, for detecting objects in a surrounding field of the motor vehicle, the radar sensor device including at least one planar antenna device that includes a plurality of vertically oriented antenna columns which are configured as a sparse array in one plane in parallel at defined mutual distances and which each have at least three line-fed patch elements;
    wherein the sparse array of antenna columns has a minimal redundancy so that a total amount of defined distances among the antenna columns in the sparse array is at least equal to all of the distances between any two of the antenna columns of a corresponding non-sparse array of a planar antenna device having a same antenna aperture and same characteristics of the antenna columns,
    wherein the defined mutual distances of the antenna columns are each an integral multiple of a constant basic distance,
    wherein the total distance is the minimum distance for which the total amount of defined distances among the antenna columns in the sparse array is at least equal to all of the distances between any two of the antenna columns,
    wherein the antenna columns are not all uniformly spaced with respect to other adjacent antenna columns,
    wherein the sparse array of antenna columns is configured to have a minimal redundancy such that a total amount of defined distances among the antenna columns in the sparse array is at least equal to all different distances between any two of the antenna columns of a corresponding non-sparse array of a planar antenna device having the same antenna aperture and the same characteristics of antenna columns, but is the minimum possible number, and
    wherein there are four of the vertically oriented antenna columns which are configured as the sparse array in one plane in parallel at defined mutual distances and which each include the line-fed patch elements, wherein a distance of 0.5·wavelength $\lambda$ in air is provided between a first one and a second one of the antenna columns, a distance of 1.5·wavelength $\lambda$ in air is provided between the second one and a third one of the antenna columns, and a distance amounting to 1.0·wavelength $\lambda$ in air is provided between the third one and a fourth one of the antenna columns, and wherein a distance of 2.0·wavelength $\lambda$ in air remains between the first one and the third one of the antenna columns, a distance of 2.5·wavelength $\lambda$ in air remains between the second one and the fourth one of the antenna columns, and a distance of 3.0·wavelength $\lambda$ in air remains between the first one and the fourth one of the antenna columns, and wherein the defined mutual distances of each of the antenna columns are each an integral multiple of a constant basic distance, which is a half of wavelength $\lambda$ in air.

6. A radar sensor device, comprising:
    at least one planar antenna device that includes a plurality of vertically oriented antenna columns which are configured as a sparse array in one plane in parallel at defined mutual distances and which each have at least three line-fed patch elements;
    wherein the sparse array of antenna columns has a minimal redundancy so that a total amount of defined distances among the antenna columns in the sparse array is at least equal to all of the distances between any two of the antenna columns of a corresponding non-sparse array of a planar antenna device having a same antenna aperture and same characteristics of the antenna columns,
    wherein the defined mutual distances of the antenna columns are each an integral multiple of a constant basic distance,
    wherein the total distance is the minimum distance for which the total amount of defined distances among the antenna columns in the sparse array is at least equal to all of the distances between any two of the antenna columns,
    wherein the antenna columns are not all uniformly spaced with respect to other adjacent antenna columns,
    wherein the sparse array of antenna columns is configured to have a minimal redundancy such that a total amount of defined distances among the antenna columns in the sparse array is at least equal to all different distances between any two of the antenna columns of a corresponding non-sparse array of a planar antenna device having the same antenna aperture and the same characteristics of antenna columns, but is the minimum possible number, and
    wherein there are four of the vertically oriented antenna columns which are configured as the sparse array in one plane in parallel at defined mutual distances and which each include the line-fed patch elements, wherein a distance of 0.5·wavelength $\lambda$ in air is provided between a first one and a second one of the antenna columns, a distance of 1.5·wavelength $\lambda$ in air is provided between the second one and a third one of the antenna columns, and a distance amounting to 1.0·wavelength $\lambda$ in air is provided between the third one and a fourth one of the antenna columns, and wherein a distance of 2.0·wavelength $\lambda$ in air remains between the first one and the third one of the antenna columns, a distance of 2.5·wavelength $\lambda$ in air remains between the second one and the fourth one of the antenna columns, and a distance of 3.0·wavelength $\lambda$ in air remains between the first one and the fourth one of the antenna columns, and wherein the defined mutual distances of each of the antenna columns are each an integral multiple of a constant basic distance, which is a half of wavelength $\lambda$ in air.

\* \* \* \* \*